US006747072B1

(12) United States Patent
Siddiqui

(10) Patent No.: US 6,747,072 B1
(45) Date of Patent: Jun. 8, 2004

(54) WHITE INK FOR MARKING CANDY SUBSTRATES

(75) Inventor: Mohammed W. Siddiqui, Carol Stream, IL (US)

(73) Assignee: Marconi Data Systems Inc., Wood Dale, IL (US)

( * ) Notice: Subject to any disclaimer, the term of this patent is extended or adjusted under 35 U.S.C. 154(b) by 0 days.

(21) Appl. No.: 08/787,405

(22) Filed: Jan. 22, 1997

Related U.S. Application Data

(63) Continuation of application No. 08/317,339, filed on Oct. 4, 1994, now abandoned.

(51) Int. Cl.⁷ .............................................. C09D 11/10
(52) U.S. Cl. ...................... 523/161; 523/100; 523/101; 523/160; 524/389; 524/497; 524/555; 424/78.24; 424/481; 424/482; 426/302; 426/383
(58) Field of Search .................................. 523/161, 100, 523/101, 160; 524/389, 497, 555; 424/78.24, 481, 482; 426/302, 383

(56) References Cited

U.S. PATENT DOCUMENTS

| | | | | | |
|---|---|---|---|---|---|
| 3,390,049 A | * | 6/1968 | Rednick et al. | ............. | 424/481 |
| 3,420,931 A | * | 1/1969 | Daum et al. | ................. | 424/479 |
| 3,524,756 A | * | 8/1970 | Signorino et al. | ......... | 427/2.19 |
| 3,738,952 A | * | 6/1973 | Signorino | .................... | 524/77 |
| 3,935,326 A | * | 1/1976 | Groppenbacher et al. | .. | 427/2.19 |
| 3,957,966 A | * | 5/1976 | Valan | .......................... | 424/482 |
| 4,168,662 A | | 9/1979 | Fell | ............................. | 101/492 |
| 4,365,035 A | | 12/1982 | Zabiak | ........................ | 524/283 |
| 4,693,751 A | | 9/1987 | Den Boer et al. | ........... | 106/209 |
| 4,720,378 A | | 1/1988 | Forse et al. | ..................... | 424/6 |
| 5,320,672 A | * | 6/1994 | Whalen-Shaw | ........ | 106/287.74 |
| 5,338,775 A | * | 8/1994 | Matz et al. | .................. | 523/161 |
| 5,395,431 A | * | 3/1995 | Siddiqui et al. | ........... | 106/20 R |

FOREIGN PATENT DOCUMENTS

| | | |
|---|---|---|
| EP | WO 93/11181 | 6/1993 |
| JP | 1031878 | 2/1989 |
| JP | 3083559 | 4/1991 |
| JP | 6073321 | 3/1994 |
| WO | WO 92/14794 | 9/1992 |

* cited by examiner

*Primary Examiner*—Terrel Morris
*Assistant Examiner*—John J. Guarriello
(74) *Attorney, Agent, or Firm*—Leydig, Voit & Mayer, Ltd.

(57) ABSTRACT

The present invention provides an ink composition for use in ink jet printing on food items, candy, particularly dark candy, such as chocolate, and to a method of forming printed images on such food items by use of the ink compositions. The compositions of the present invention comprise a pigment, a binder, and an aqueous carrier.

21 Claims, No Drawings

WHITE INK FOR MARKING CANDY SUBSTRATES

This is a continuation of copending application Ser. No. 08/317,339 filed on Oct. 4, 1994, now abandoned.

FIELD OF THE INVENTION

The present invention relates to ink jet compositions, generally, and in particular to jet ink compositions that are especially useful for marking on food items, especially candies, particularly chocolate.

BACKGROUND OF THE INVENTION

Presently, most marking of information on food items, such as chocolate, is done by use of direct contact printing. Such a technique presents its own difficulty. Good print quality using direct contact printing is difficult to achieve when printing on nonuniform, irregular surfaces, as are presented when one attempts to print on chocolate. Damage, such as breakage, also is likely to occur, due to the irregular pressure applied to the chocolate. Inks used for food product contact printing, employing dyes, include those discussed in Japanese published applications JP 6073321; JP 3083559; and JP 1031878; U.S. Pat. Nos. 4,693,751 and 4,720,378; and Canadian patent 1,251,307.

Further, it is often useful to place variable information on food items, such as chocolate. A quick, easy manner of placing such information on such food items is presently desired. Also, desirable for brand recognition, is the ability to make images on the food item, as by ink printing a corporate logo or the like.

Ink jet printing would offer the advantage of increased speed of marking food products and the opportunity to put variable information on food items, such as chocolate.

Ink jet printing is a well-known technique by which printing is accomplished without contact between the printing device and the substrate on which the printed, characters are deposited. Ink jet printing systems are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At this break-up point, the droplets are charged in accordance with digital data signals. These drops are then passed through an electrostatic field which adjusts the trajectory of each droplet. The droplets are either directed back to a gutter for recirculation or to a specific location on the substrate to create the desired character matrix.

In drop-on-demand systems, a droplet is expelled under pressure from a valve directly to a position on the substrate in accordance with the digital data signals. A droplet is not formed or expelled unless it is to be jetted to the substrate. Since drop-on-demand systems require no ink recovery, charging, or deflection, the system is much simpler than the continuous stream system.

A problem associated with the direct marking of food items, such as chocolate, however, is that the information on the chocolate must be and remain readable under a variety of conditions and must be stable. Because packaged or boxed chocolate is often subjected to changing conditions during transport, the surface of the chocolate can develop condensation or sweat. The printed information on the surface of the chocolate must remain readable even under such temperature and humidity extremes and sudden changes therein. The appearance of the printed image must not bleed, disappear, fade, or transfer to any packaging media placed in contact therewith, under any of the conditions and environmental changes that it may encounter.

To attempt to address this need for noncontact printing on food, some have employed the use of dye based food grade jet inks. Such inks, however, if printed onto dark candies, and the like, such as chocolate, fail to show up at all, or are only marginally readable. The problem, however, has been that ink used in such a fashion must meet the aforementioned rigid requirements, but also must be capable of being printed by use of existing ink jet printing equipment. Further, the printed image must be of food grade quality, edible and compliant with all applicable regulatory requirements such as those set forth by the U.S. Food and Drug Administration in the Code of Federal Regulations (CFR). Accordingly, there remains a need for a high quality ink jet composition that can be used to print by ink jet printing onto the surfaces of candies, such as chocolate, that will fulfill the rigid requirements as discussed above and yet be suitable for such a food-contact use, and thus comply with the list of acceptable ingredients as provided by governmental authorities such as the U.S. FDA.

Such an ink must be capable of providing printed images with good rub resistance, while employing components that are suitable for food contact.

SUMMARY OF THE INVENTION

Surprisingly, there has been discovered a white ink having good opacity when printed on a dark substrate, such as chocolate, which ink is comprised of components that are all acceptable for use on food for human consumption.

The present invention thus provides an ink composition for use in jet printing on food items, especially candies, particularly chocolate, and a method of forming printed images on such food items by use of such composition.

The composition of the present invention comprises pigment, preferably titanium dioxide, a binder and a carrier, preferably water.

The composition is free of components that are undesirable in an ink that is used for food contact, such as methyl ethyl ketone or acetone.

DETAILED DESCRIPTION OF THE PREFERRED EMBODIMENTS

Thus, the present invention provides an ink composition suitable for ink jet printing onto a food item comprising a pigment having a particle size from about 0.1 micron to about 3.0 micron, a binder and an aqueous carrier, wherein the pigment is present in an amount from about 4.0% to about 16.0%, and the binder is present in an amount from about 2.0% to about 10.0%, based on the total weight of the composition, and the ratio of the pigment to the binder is from about 0.4 to about 8%.

The formulated jet inks of the present invention will exhibit the following characteristics: (1) a viscosity from about 1 to about 10 centipoise (cps) at 25° C., (2) an electrical resistivity from about 50 to about 2,500 ohms-cm, (3) a sonic velocity from about 1,000 to about 1,700 m/sec., and (4) a surface tension below 70 dynes/cm.

The Carrier

The carrier of the present invention comprises water. Deionized water is preferred, for reasons of purity. Optionally, a cosolvent, such as a lower alcohol, particularly ethanol may be present. The lower alcohol may be a mixture of lower alcohols, such as the denatured alcohol SDA-3A (ethanol with 5% methanol added as denaturant), as is allowed by the U.S. FDA for this type of application.

The carrier is usually present in an amount from about 60.0% to about 80.0%, preferably from about 70.0% to about 78.0%

The Pigment

The composition of the invention also contains a colorant which is dispersed in the carrier medium. It is preferred that the colorant be one which forms a distinctly visible image on the substrate, for example a pigment, particularly titanium dioxide.

The pigment is usually present in an amount from about 4.0% to about 16.0% by weight of the ink composition, with an amount of from about 8.0% to about 10.0% by weight being preferred.

Useful pigments are available in the form of dispersions, which may contain a dispersing aid, such as glycerol, in the dispersion. Such dispersions are preferred. One such typical dispersion is White Color 23.230, marketed by Flavorchem, Downers Grove, Ill., which has the following properties. It is a dispersion containing approximately 47 percent, by weight, of titanium dioxide, 43 percent of glycerol and 10 percent of water, having a specific gravity of approximately 1.7.

The pigments of use in the present invention are those having particles within the size range from about 0.1 to about 3.0 microns, with at least about 98 percent of said particles having diameters less than about 1.0 micron, preferably less than about 0.7 micron. Preferably, the median particle size is from about 0.3 to about 0.6 micron.

The pigment particles are, therefore, free of pigment particles that are larger than about 5.0 microns. For purposes of determining median particle size and absolute particle size, the following technique should be employed.

The particle size analysis of the pigment is performed using a photosedimentometer developed by Joyce-Loebl Co.

The instrument uses a centrifugal method of analysis. The test specimen is injected into a rotating disc centrifuge. As the pigment particles start to move due to the centrifugal force, a light beam fixed at a point in the instrument, senses the particle migration and electronically records the centrifuge time. The bigger the particle size, the lower the centrifuge time will be required, the smaller particle will have longer centrifuge times. Based on this principle a computerized data and graph analysis of the particles are obtained.

Binder Resin

The binder of the present invention may be any binder that is acceptable for use on food. Such binders include shellac, poly(1-vinyl-2-pyrolidone), and others listed on the U.S.F.D.A. Generally Recognized As Safe (GRAS) list. The binder preferably comprises poly(1-vinyl-2-pyrolidone). Such a binder is sold by GAF Chemicals under the trademark Plasdone K29/32.

The binder is usually present in an amount from about 2.0% to about 10.0% by weight of the ink composition, with an amount from about 4.0% to about 6.0% by weight being preferred.

Of particular importance is the ratio of pigment to binder. That weight ratio should be from about 0.4 to about 8.0, with a ratio from about 1.3 to about 2.4 being preferred.

The Humectant

Additionally, a humectant can be used to prevent the ink jet tip from drying, and the nozzle/valve from clogging. It can also act as a viscosity control agent. Propylene glycol and any other suitable compound from the GRAS List that has the desired properties can be used. Ink viscosity can be tailor-made using this viscous material.

The humectant, if present, should be present in an amount from about 1.0% to about 7.0% by weight of the ink composition, with an amount of from about 2.0% to about 4.0% being preferred.

Other Optical Components

Other components may also be included in the ink compositions of the present invention to impart characteristics desirable for ink jet printing applications.

An antifoam agent may be present to prevent undesired foaming of the formulation. Such antifoam agents include those comprised of food-grade, non-ionic, silicone emulsions, such as the non-ionic 10% silicone emulsion marketed by Dow Corning under the trademark Antifoam 1510-US.

It may also be desirable to add a bactericide. Water based inks are susceptible to bacterial attack, fouling-up ink manufacturing equipments and printers. Suitable bactericides include methyl para-hydroxybenzoate, available as methylparaben from Aldrich Chemicals. The bactericide, if one is used, should be present in an amount from about 0.01% to about 0.20% by weight of the ink composition.

The compositions of the present invention may also contain conductivity agents. If present, they should be present in amounts of from about 0.1% to about 0.5% by weight of the ink composition. Examples of suitable conductivity agents are food grade ammonium, sodium or potassium salts of organic acids, such as sodium acetate, potassium lactate or sodium propionate.

A pH control agent may also be used in the ink composition from the GRAS List to insure that the components of the ink composition remain soluble throughout the range of water and throughout the ink's stated shelf life. For this purpose, it is desirable to maintain the pH of the ink at about 7.0–10.5, e.g., about 7.5 and 10. A pH of 9.0 being optimal. The pH is dependent upon the components which are employed in the composition. Although use can be made of inorganic bases such as sodium hydroxide and potassium hydroxide, their presence in the printed character leads to poor water resistance after drying. It is preferred to make use of an organic base which can be eliminated by evaporation. Best use is made of a pH adjusting agent that evaporates rapidly to accelerate development of water resistance upon aging. Thus, use can be made of ammonium hydroxide or ammonium chloride, for controlling pH within the desired range.

Typically, the pH control agent is present in an amount from about 0.05% to about 5.0% by weight of the ink composition. The optimal amount will vary depending upon the specific components of the ink composition.

The present invention may also comprise other additives, which maybe any substance that can enhance the ink with regard to (i) improved solubility of other components, (ii) improved print quality, (iii) improved adhesion of the ink to the media, and (iv) control of wetting characteristics, which may be related to such properties as surface tension and viscosity, among other properties. Again, because the principal application of the inks of the present invention involve direct food contact, any such additional components should be appropriate for food contact uses, such as those components listed in Volume 21, Chapter 1, Part 73.1 of the CFR or Part 184 of the same volume and chapter.

It is preferred to use all components in the composition which are food grade or edible.

Manufacture

The ink compositions of the present invention can be made by conventional means. Preferably, the pigment is dissolved or dispersed in the carrier. The pigment may be in a dry, aqueous or other suitable solvent form. The pigment is incorporated into the carrier for present use using any suitable mixing technique. The pigment may also be available in the form of a particulate solid or pigment, which can be used as such for direct dissolution in the solvent medium. Many forms of suitable dyestuff, notably water soluble food grade dyestuffs, are commercially available and may be used in their commercially available purity.

Thus, the present invention provides an ink composition suitable for ink jet printing onto a food item comprising a pigment having a particle size from about 0.1 microns to about 3.0 microns, a binder and an aqueous carrier, wherein the pigment is present in an amount from about 4.0% to about 16.0% and the binder is present in an amount from about 2.0 to about 10.0%, based on the total weight of the composition, and the ratio of the pigment to the binder is from about 0.4 to about 8.0.

As such an ink can be applied using traditional ink jet printing techniques, the present invention also provided a method of printing an image on an edible substrate comprising forming said image on said substrate by use of such an ink. As indicated, the substrate may be an edible substrate, or food item, such as candy or chocolate. The ink of the present invention provides a good visible, white image when printed onto even dark substrates, such as chocolate.

All percentages expressed herein are percentages by weight, unless otherwise, specified, and are based on the total weight of the ink composition unless stated otherwise.

All references cited herein are expressly incorporated herein in their entirety.

The following Examples are illustrative of an ink jet composition of the present invention and are not to be construed as limitations on the scope of the invention.

EXAMPLE 1

The following formulation was made by mixing the components:

| Material | % By Weight |
| --- | --- |
| Deionized Water | 74.80 |
| Plasdone K29/32 | 5.00 |
| Methyl-4-Hydroxybenzoate | 0.05 |
| Ammonium Hydroxide | 0.10 |
| White Color 23.230 | 20.00 |
| Antifoam 1510-US | 0.05 |
| Total | 100.00 |

The ink was applied by ink jet printing to candies and resulted in a printed message having good contrast.

EXAMPLE 2

The following formulation was made by mixing the components:

| | |
| --- | --- |
| Deionized Water | 70.79 |
| Plasdone | 5.00 |
| Methyl 4-Hydroxybenzoate | 0.05 |
| Ammonium Hydroxide | 0.10 |
| White Color 23.230 | 24.00 |
| Antfoam 1510-US | 0.06 |
| | 100.00 |

What is claimed is:

1. An ink jet ink composition for printing onto a food item comprising a pigment having a particle size from about 0.1 to about 3.0 microns, a binder and an aqueous carrier, wherein the pigment is present in an amount from about 4.0 to about 16.0% and the binder is present in an amount from about 2.0 to about 10.0%, based on the total weight of the ink jet ink composition, and the ratio of the pigment to the binder is from about 0.4 to about 8.0, wherein said ink jet ink composition exhibits (1) a viscosity from about 1 to about 10 centipoise (cps) at 25° C., (2) an electrical resistivity from about 50 to about 2,500 ohms-cm, (3) a sonic velocity from about 1,000 to about 1,700 m/sec., and (4) a surface tension from 62 to 70 dynes/cm; and wherein said ink jet ink composition is substantially free of components that are unfit for human consumption.

2. The ink jet ink composition of claim 1, wherein the pigment is titanium dioxide.

3. The ink jet ink composition of claim 1, wherein the binder comprises poly(1-vinyl-2-pyrrolidone).

4. The ink jet ink composition of claim 3, wherein the pigment is titanium dioxide.

5. The ink jet ink composition of claim 4 having a surface tension of 62 dynes/cm.

6. A food item having an image thereon, said image having been formed by use of ink jet printing wherein the ink is the ink jet ink composition of claim 1.

7. The food item of claim 6, wherein the food item is a candy.

8. The food item of claim 7, wherein the candy is a chocolate.

9. A method of printing an image on an edible substrate comprising forming an ink composition into droplets and directing the droplets to a specific location on said substrate to form said image, said ink composition comprising a pigment having a particle size from about 0.1 to about 3.0 microns, a binder, and an aqueous carrier, wherein the pigment is present in an amount from about 4.0 to about 16.0% and the binder is present in an amount from about 2.0 to about 10.0%, based on the total weight of the ink composition, and the ratio of the pigment to the binder is from about 0.4 to about 8.0, wherein said ink composition exhibits (1) a viscosity from about 1 to about 10 centipoise (cps) at 25° C., (2) and electrical resistivity from about 50 to about 2,500 ohms-cm, (3) a sonic velocity from about 1,000 to about 1,700 m/sec., and (4) a surface tension from 62 to 70 dynes/cm; and wherein said ink composition consists essentially of components that are food grade or edible.

10. The method of claim 9, wherein the substrate is a candy.

11. The method of claim 8, wherein the candy is a chocolate.

12. The method of claim 9, wherein said pigment is titanium dioxide and the binder comprises poly(1-vinyl-2-pyrrolidone).

13. The method of claim 10, wherein the substrate is a chocolate.

14. An ink jet ink composition for printing onto a food item comprising a pigment having a particle size from about 0.1 to about 3.0 microns, a binder and an aqueous carrier, wherein the pigment is present in an amount from about 4.0 to about 16.0% and the binder is present in an amount from about 2.0 to about 10.0%, based on the total weight of the ink jet ink composition, and the ratio of the pigment to the binder is from about 0.4 to about 8.0, wherein said ink jet ink composition exhibits (1) a viscosity from about 1 to about 10 centipoise (cps) at 25° C., (2) an electrical resistivity from about 50 to about 2,500 ohms-cm, (3) a sonic velocity from about 1,000 to about 1,700 m/sec., and (4) a surface tension from 62 to 70 dynes/em; and wherein said ink jet ink composition consists essentially of components that are food grade or edible.

15. The ink jet ink composition of claim 14, wherein the pigment is titanium dioxide.

16. The ink jet ink composition of claim 14, wherein the binder comprises poly(1-vinyl-2-pyrrolidone).

17. The ink jet ink composition of claim 16, wherein the pigment is titanium dioxide.

18. A method of printing an image onto a food item comprising forming the ink jet ink composition of claim 14 into droplets and directing the droplets to a specific location on said food item.

19. The method of claim 18, wherein the pigment is titanium dioxide.

20. The method of claim 18, wherein the binder comprises poly(1-vinyl-2-pyrrolidone).

21. The method of claim 20, wherein the pigment is titanium dioxide.

* * * * *